(12) United States Patent
Pat et al.

(10) Patent No.: US 8,880,751 B2
(45) Date of Patent: Nov. 4, 2014

(54) SYSTEMS AND METHODS FOR PROVIDING COMBINED CONFIGURATION MANAGEMENT AND PRODUCT IDENTIFICATION

(71) Applicant: XEROX Corporation, Norwalk, CT (US)

(72) Inventors: Andrew Pat, Liverpool (GB); Leslie Wynn, Hertfordshire (GB); Christopher Olliffe, Hertfordshire (GB); Donald A Brown, Honeoye Falls, NY (US)

(73) Assignee: XEROX Corporation, Norwalk, CT (US)

( * ) Notice: Subject to any disclaimer, the term of this patent is extended or adjusted under 35 U.S.C. 154(b) by 85 days.

(21) Appl. No.: 13/664,398

(22) Filed: Oct. 30, 2012

(65) Prior Publication Data

US 2014/0122748 A1    May 1, 2014

(51) Int. Cl.
*G06F 3/06* (2006.01)
*G06F 13/00* (2006.01)

(52) U.S. Cl.
CPC ........................................ *G06F 3/06* (2013.01)
USPC ............. 710/13; 710/2; 710/5; 710/8; 710/15

(58) Field of Classification Search
None
See application file for complete search history.

(56) References Cited

U.S. PATENT DOCUMENTS

| 2006/0178053 A1* | 8/2006 | Inaba ............................ 439/630 |
| 2013/0087623 A1* | 4/2013 | Harari et al. .................. 235/492 |

* cited by examiner

*Primary Examiner* — Scott Sun
(74) *Attorney, Agent, or Firm* — Ronald E. Prass, Jr.; Prass LLP

(57) ABSTRACT

A system and method to facilitate attempts to ensure that electronic devices are properly and currently configured with correct information stored on electronically writable/readable digital data storage media are provided including a direct linkage between the media as the mechanism used to electronically configure the electronic device and physical product identification labeling that may be properly viewed from outside the electronic device when the media is inserted in the electronic device. Particular components that are traditionally separately provided, e.g., SIM cards and device identification labeling are combined in a unique packaging and delivery system to combine configuration update electronically readable/writable digital data storage media and physical product identification in a single unique package.

22 Claims, 6 Drawing Sheets

SYSTEMS AND METHODS FOR PROVIDING COMBINED CONFIGURATION MANAGEMENT AND PRODUCT IDENTIFICATION

BACKGROUND

1. Field of the Disclosed Embodiments

This disclosure relates to systems and methods for providing a direct linkage between a mechanism used to electronically configure a system and physical product identification labeling.

2. Related Art

All manner of computing devices and image forming devices ("electronic devices") are fielded for use by individual customers and end users. In order for manufacturers to efficiently produce, sell and deliver these electronic devices, the operating systems housed in, or associated with, the electronic devices are often generically configured with baseline capabilities and standard sets of operating characteristics when the electronic devices are produced for and delivered to the customers or end users.

The customers and end users often have particular, sometimes proprietary or market competitive, operating requirements for the electronic devices that they procure for their use, or use within their facilities. The customers or end users may specify certain capabilities or sets of operating characteristics that they want included in their electronic devices according to their particular operating requirements.

The customer and end user specified capabilities or sets of operating characteristics are often converted to device operating instructions by the electronic device manufacturers, but may not be included in the electronic devices, as shipped, for any of a number of reasons, including security or any of the other reasons mentioned above. Initial installations, and routine updates, of customer or end user specific operating characteristics and capabilities, therefore, need to be performed.

It is also important to maintain some inventory and/or configuration control over the electronic devices for the customers and end users, and the manufacturers and suppliers alike. It can be advantageous to be able to readily recognize or identify that a particular update has been installed.

With the broadening spectrum of individual electronic devices being employed for commercial and personal use, the traditional models of customer support have evolved well beyond deploying manufacturers' customer service personnel to perform verifiable system updates. Installations and updates of electronic device operating characteristics are often delivered to individual customers or end users as sets of instructions or data recorded on some form of electronically writable/readable digital data storage media.

The routine use of electronically writable/readable digital data storage media carries with it certain disadvantages. Among these disadvantages is that configuration control can get out of hand, for example, in organizations with large numbers of electronic devices and different versions of electronically writable/readable digital data storage media carrying different versions of operating characteristics for the electronic devices. This may be particularly the case in instances where there may be (1) no readily identifiable means is provided by which to confirm which particular version of operating characteristics are present on a particular electronic device or (2) some identification of the electronically writable/readable digital data storage media bearing update is provided separately from, and only loosely associated with, the electronically writable/readable digital data storage media. There may be no simple manner by which to verify that a particular operating characteristic install or update has been accomplished without turning the electronic device on, which may be undesirable in any number of scenarios for simply verifying a set of electronic device operating characteristics. This scenario may also produce difficulties for customer companies, for example, when a need arises for manufacturers' customer service personnel to troubleshoot difficulties with particular electronic devices without knowing which version of a software package the customer service personnel should bring to assist in the troubleshooting.

Separately, manufacturers and their authorized suppliers may realize significant separate revenue streams from post-sale support of the electronic devices that they manufacture or supply. This revenue stream is being increasingly affected by the intrusion into the marketplace of companies providing copies of, or otherwise counterfeit, support products of all types, including electronic writable/readable digital data storage media with putatively upgraded software components for a particular electronic device. To address the use of these "grey" market products, many electronic device manufacturers are incorporating increasingly sophisticated physical and/or electronically data-based compatibility and security schemes in the electronic devices and the replacement and support products associated with those devices. Reputable, authorized, secure and/or compatible electronic writable/readable digital data storage media supplied by the manufacturers may be "coded" in a manner that may be difficult to clone, thereby aiding efforts to curtail the use of grey market components. Features may be added to effect particular physical compatibility, or otherwise necessary compatibility information may be included in the stored electronic data that the customer-owned or customer-controlled devices must read from electronically writable/readable digital data storage media to cause the electronic devices to continue to operate properly once the initial installations or subsequent updates to their operating characteristics are effected. In this manner, the electronic writable/readable digital data storage media can be used to address issues of fraud and security with regard to the electronic devices themselves. Specifically, the electronic writable/readable digital data storage media provides a vehicle by which to provide its own verifiable compatibility confirmation scheme to the electronic device in an attempt to ensure that only an electronic device manufacturer's proprietary, authorized, secure and/or compatible operating characteristic update information rather than a copy or counterfeit update is implemented.

SUMMARY OF THE DISCLOSED EMBODIMENTS

Subscriber Identity Module (SIM) cards are gaining increasing popularity as an electronically writable/readable digital data storage medium by which to install software updates in many types of electronic devices. The SIM card is a portable memory chip used in many portable electronic devices to hold all manner of electronic information including data and certain operating characteristic programming. The small size and portability of the SIM card provides a convenient mechanism for a customer or end user to provide data to, and otherwise initialize and/or update operating characteristics of, a particular electronic device. The small size, unfortunately, leaves little room for external markings to readily signify to the customer or end user a serial number, a batch number, an update number, or other like identifying information that may be associated with the electronic device, the SIM card or information stored on the SIM card. When a customer or end user wants to install, update or otherwise modify the operating characteristics of a particular electronic device to ensure that the particular electronic device includes consistent information, the customer or end user may easily remove the SIM card from one electronic device and install it in another, easily transferring the information in the form of stored data including operating characteristics on the SIM card from one particular electronic device to another. These advantages in the employment of SIM cards make their use popular with many customers or end users as a physical information transmission and transfer medium between devices.

In view of the above discussion regarding the increasingly widespread use of SIM cards and the above indicated necessity to provide customers and end users with a simple manner by which to verify a particular configuration in an electronic device employing a SIM card for update of the operating characteristics for the electronic device, it would be advantageous to develop a system and method for easily ensuring that the electronic device has been properly or currently configured with correct information stored on the SIM card as an electronically writable/readable digital data storage medium. It would be further advantageous to supplement the above by providing for a direct linkage between a the SIM card as the mechanism used to electronically configure the electronic device and physical product identification labeling that may be properly viewed from outside the electronic device when the SIM card is used to provide such a configuration.

Exemplary embodiments of the systems and methods according to this disclosure may address an issue with electronically configurable or updatable products, and particularly a broad spectrum of individual electronic devices, by providing a mechanism by which to attempt to easily assure a customer or end user that the electronic devices delivered to, and operated by, the customer or end user are the electronic devices that the customer or end user purchased or procured for use and that they are readily visually identified as such.

Exemplary embodiments may take particular components that are traditionally separately provided, e.g., SIM cards and device identification labeling, and combine those components in unique packaging to combine configuration update electronically readable/writable digital data storage media and physical product identification in a single unique package.

Exemplary embodiments may provide a new physical carrier device for a SIM card or other like electronically readable/writable digital data storage media for system configuration that is uniquely compatible to accepting the SIM card or other media and to being inserted into the electronic device to be updated according to a specific physical configuration.

Exemplary embodiments may provide product specific physical labeling attached to, or formed in, a unique physical carrier in a manner that provides a readily identifiable labeling on an outer surface of the electronic device into which the carrier is installed as a single unit. The labeling may carry information appropriate to identifying the electronic device and a specific electronically updated configuration of the operating characteristics for the electronic device.

In exemplary embodiments, the inclusion of the product identification labeling in or on the unique physical carrier device may aid in ensuring that inventory and/or configuration control is assisted by identifying to customers or end users of the electronic device the installation of a specific operating characteristic configuration in the electronic device by reading from the SIM card.

Exemplary embodiments may provide systems and methods that simultaneously uniquely configure a system at a customer-owned or customer-controlled location and provide physical identification of the configuration using a single unique carrier device that can be installed in a single action.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for providing a direct linkage between a mechanism used to configure an electronic device and physical product identification labeling, will be described, in detail, with reference to the following drawings, in which.

DETAILED DESCRIPTION OF THE DISCLOSED EMBODIMENTS

Figure 1:
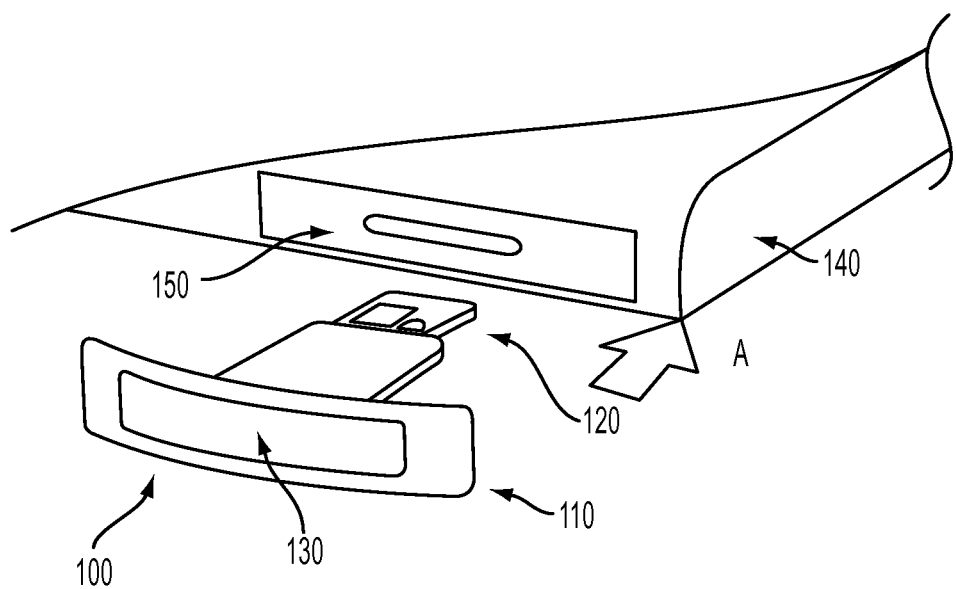
FIG. 1 illustrates a perspective view of an exemplary carrier package for installation into, and configuration of, and electronic device according to this disclosure.

The systems and methods for providing a direct linkage between a mechanism used to configure an electronic device and a physical product identification labeling according to this disclosure will generally refer to this specific combination of utilities for those systems and methods. Exemplary embodiments described and depicted in this disclosure should not be interpreted as being specifically limited to any particular configuration of an updateable electronic device or a physical electronic media carrier, or limited to only the very particular intended uses described in this disclosure. In fact, any advantageous use of an electronically writable/readable digital data storage medium with a physical structure compatible to an updateable electronic device including labeling for identification of a particular configuration of the updateable electronic device that may benefit from use of the medium as a verifiable vehicle for updating operating characteristics to be used in the processor controlling the electronic device using methods discussed in this disclosure is contemplated.

Specific reference to, for example, any particular electronic writable/readable digital data storage medium, including but not limited to specifically a SIM card, as used in this disclosure should be understood as being exemplary only, and not limiting, in any manner, to any particular class of such electronically writable/readable digital's data storage medium. The systems and methods according to this disclosure will be described as being particularly adaptable to using a SIM card as the electronically writable/readable digital data storage medium, but the use of other media, particularly in a form that may be inserted into an electronic device using an associated carrier that may maintain some manner of conformal external profile for the electronic device is contemplated.

The disclosed mechanism may allow an electronic device to be uniquely configured and correctly identified in a single action. A benefit of the disclosed subject matter is that an electronic configuration media device and a product identifier are combined into a single unit. In employing the disclosed system, a customer or end user order for one or more electronic devices having particular operating characteristics is broken down into unique individual parts. These unique individual parts may include a correct SIM card for a particular customer or end user operating characteristic configuration and matching product identification labeling. The individual component parts may be bundled with a particular electronic device for shipping to the customer or end user or may be shipped separately. At the customer or end user site, the SIM card may be correctly assembled into the unique carrier device with the product labeling formed in or attached to an outer surface of the unique carrier device that will remain visually exposed on an outer profile of the electronic device when the unique carrier device, SIM card and labeling combined assembly is installed in the electronic device. The combined assembly may then be installed in the electronic device such that on a next power up and initialization process for the electronic device new configuration information available on the SIM card may be provided to update the operating characteristics for the electronic device, while information regarding the electronic device or the update will remain identified according to the exposed labeling. This assembly and insertion process may be according to instructions provided in the packaging for the customer or end user.

The disclosed mechanism seeks to avoid difficulties and potential additional costs associated with conventional processes to ensure that a correct configuration device is dispatched with a correct identification labeling. The disclosed unique carrier device may provide a reduction in a size of the included product labeling, thereby adding flexibility over conventional processes in which the size of the product identity labeling has been known to cause difficulties in packaging, storage and replacement when provided to a customer or end user incumbent to electronic device configuration/reconfiguration using some form of electronically writable/readable digital data storage media. The disclosed mechanism provides a clean and simple solution to identified shortfalls in the prior art.

FIG. 1 illustrates a perspective view of an exemplary carrier package 100 for installation into, and configuration of, an electronic device 140 according to this disclosure. As shown in FIG. 1, the exemplary carrier package 100 may include a unique carrier appliance 110 into which a SIM card 120 may be inserted. The body of the SIM card 120 may be provided with a unique external physical profile, which may include at least one added protrusion or depression, that may correspond to, or be particularly compatible with, a unique internal physical profile of a slot which may include at least one corresponding added protrusion or depression, in the unique carrier appliance 110 into which the SIM card 120 may be inserted for use according to this disclosure.

The exemplary carrier package 100, once the unique carrier appliance 110 and the SIM card 120 are properly assembled together, may then be inserted into a receiver slot 150 in the electronic device 140 with which the exemplary carrier package 100 is to be associated in direction A. Upon insertion and power up of the electronic device 140, operating characteristic information stored on the SIM card 120 may be provided to the electronic device 140 in order to update the operating characteristics of the electronic device 140 according to a customer's or end user's requirements or desires as indicated to a manufacturer or supplier of the electronic device 140.

As with the combination of the unique carrier appliance 110 and the SIM card 120, the portion of the unique carrier appliance 110 that is to be inserted into the receiver slot 150 may be provided with a unique external physical profile, which may include at least one added protrusion or depression, that may correspond to, or be particularly compatible with, a unique internal physical profile, which may include at least one corresponding added protrusion or depression, of the receiver slot 150 into which the unique carrier appliance 110 may be inserted for use according to this disclosure. These unique physical constraints, including pairs of uniquely corresponding protrusions and depressions between components, may provide a certain level of compatibility assurance first between the SIM card 120 and the unique carrier appliance 110, and then between the unique carrier appliance 110 and SIM card 120 combination and the receiver slot 150 in the electronic device 140. These physical attributes of the various components, including pairs of corresponding protrusions and depressions between components, may aid in assuring that the operating characteristic update provided by the SIM card is an operating characteristic update that is compatible with, and authorized to be employed by, the electronic device 140 in a manner that improves device security and may aid in reducing a proliferation of gray market components with respect to the electronic device 140.

The exemplary carrier package 100 may include associated labeling 130 that is attachable to, or formed in a portion of the external body of the unique carrier device 110, the portion being configured to remain visible on at least a portion of an outside profile of the electronic device 140 when the exemplary carrier package 100, including the assembled SIM card 120, is inserted into the receiver slot 150 of the electronic device 140. As is indicated above, the associated labeling 130 is intended to uniquely identify the electronic device 140 and/or the version of the operating characteristics program resident in the electronic device 140 as a result of being installed and/or updated with the operating characteristic information stored on the SIM card 120.

Figure 2:
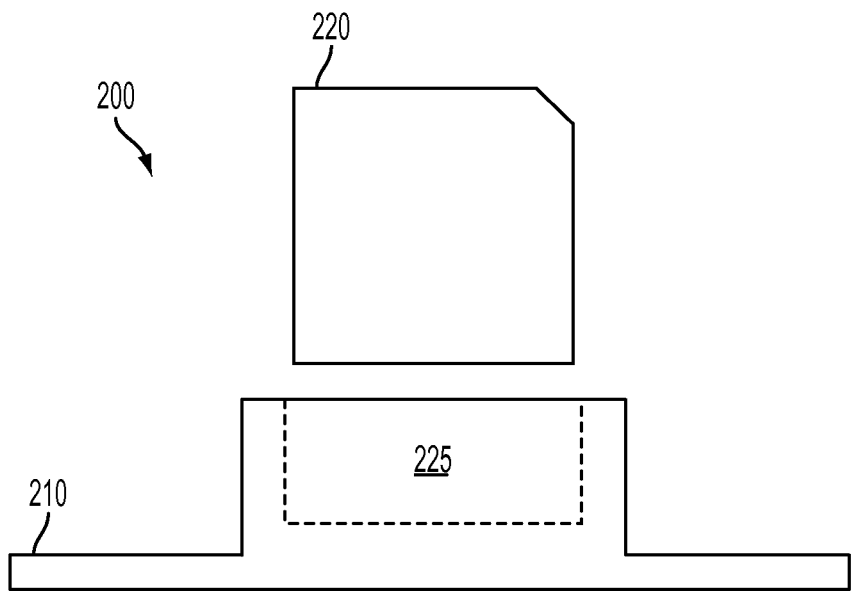
FIG. 2 illustrates an exploded top view of an exemplary carrier package and SIM card combination according to this disclosure.
Figure 3:
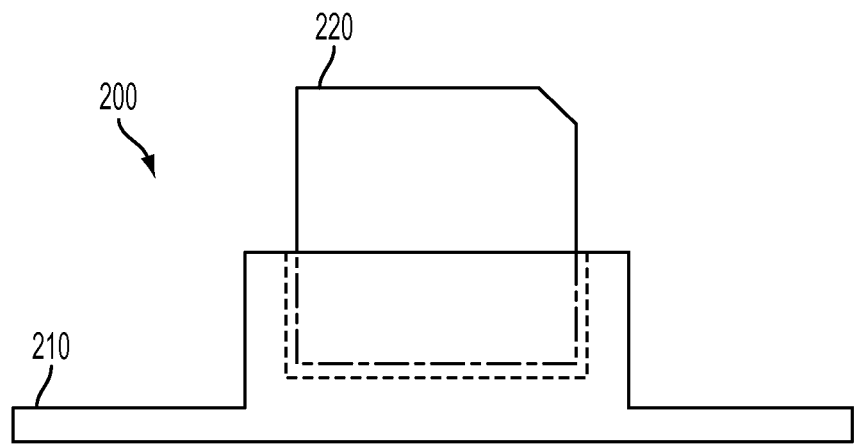
FIG. 3 illustrates a top view of the SIM card installed in the exemplary carrier package as a combined unit according to this disclosure.

FIG. 2 illustrates an exploded top view of an exemplary embodiment 200 of a unique carrier appliance 210 and SIM card 220 combination, while FIG. 3 illustrates a similar top view of the SIM card 220 installed in a slot 225 of the unique carrier appliance 210 as a combined unit.

Figure 4:
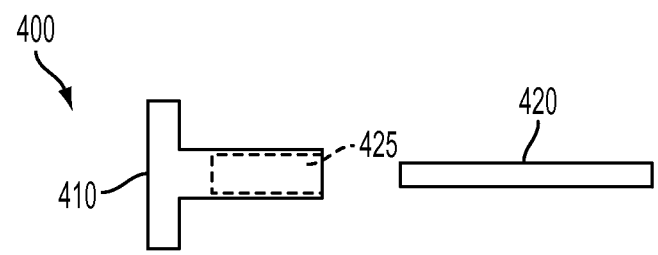
FIG. 4 illustrates an exploded side view of an exemplary carrier package and SIM card combination according to this disclosure.
Figure 5:
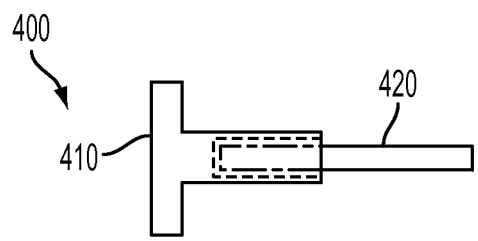
FIG. 5 illustrates a side view of the SIM card installed in the exemplary carrier package as a combined unit according to this disclosure.

FIG. 4 illustrates an exploded side view of an exemplary embodiment 400 of a unique carrier appliance 410 and SIM card 420 combination, while FIG. 5 illustrates a similar side view of the SIM card 420 installed in a slot 425 of the unique carrier appliance 410 as a combined unit.

Figure 6:
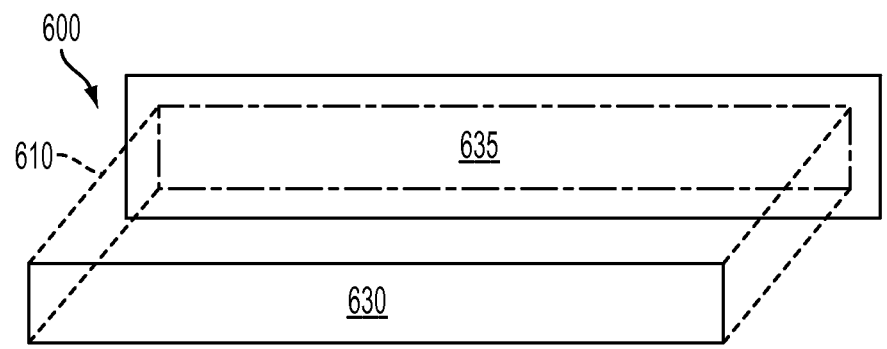
FIG. 6 illustrates an exploded external view of an exemplary carrier package and label combination according to this disclosure.
Figure 7:
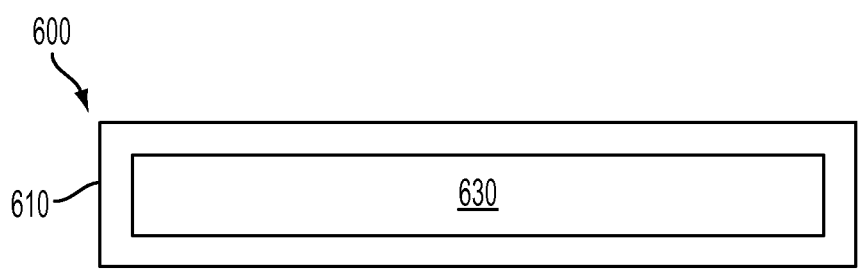
FIG. 7 illustrates an external view of the label installed in/on the exemplary carrier package as a combined unit according to this disclosure.

FIG. 6 illustrates an exploded external view of an exemplary embodiment 600 of a unique carrier appliance 610 and label 630 combination, while FIG. 7 illustrates a similar external view of the label 630 installed in/on a receiving portion 635 of the unique carrier appliance 610 as a combined unit.

As indicated above, the individual components of the unique carrier appliance, the SIM card and the associated labeling may be bundled as a combination package with the electronic device with which they are to be associated. Alternatively, the individual components of the unique carrier appliance, the SIM card and the associated labeling may be packaged together with a set of installation instructions and provided separately to a customer or end-user from delivery of the electronic device with which they are to be associated. This latter scenario almost reasonably occur in instances where the SIM card is intended to provide the electronically writable/readable digital data storage medium including instructions for updating an operating characteristic configuration of the electronic device subsequent to delivery of the electronic device to the customer or end-user.

Upon receipt by the customer or end-user, the individual component pieces of the unique carrier appliance, the SIM card and the associated labeling may be assembled by the customer or end-user in the manner shown in the figures, and as described above. The combined unit of the unique carrier appliance, the SIM card and the associated labeling may then be installed in the electronic device to provide electronic configuration update and product identification in a single device.

Figure 8:
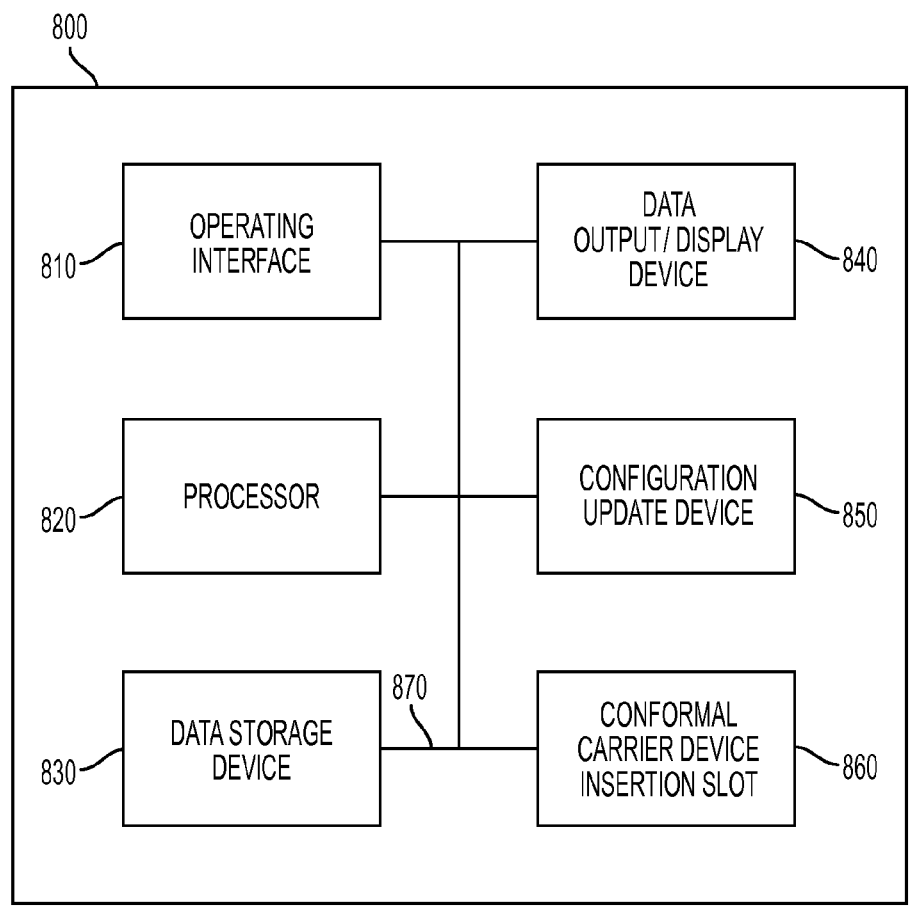
FIG. 8 illustrates a block diagram of an exemplary electronic device into which the combined carrier package according to this disclosure may be installed for configuration update and physical identification.

FIG. 8 illustrates a block diagram of an exemplary electronic device 800 into which the combined carrier package according to this disclosure may be installed for configuration update and physical identification.

The exemplary electronic device 800 may include an operating interface 810 by which a user may communicate with the exemplary electronic device 800. The operating interface 810 may be a locally accessible user interface associated with the exemplary electronic device in hundred. The operating interface 810 may be configured as one or more conventional mechanisms common to image forming devices and/or computing devices that may permit a user to input information to the exemplary electronic device 800. The operating interface 810 may include, for example, a conventional keyboard, a touchscreen with "soft" buttons or with various components for use with a compatible stylus, a microphone by which a user may provide oral commands to the exemplary electronic device 800 to be "translated" by a voice recognition program, or other like device by which a user may communicate specific operating instructions to the exemplary electronic device 800. The operating interface 810 may also be a part of a function of a graphical user interface (GUI) mounted on, integral to, or associated with, the exemplary electronic device 800.

The exemplary electronic device 800 may include one or more local processors 820 for individually operating the exemplary electronic device 800 and for carrying out operating functions, including executing information exchange with installed or inserted electronically writable/readable digital data storage media. Processor(s) 820 may include at least one conventional processor or microprocessor that interprets and executes instructions to direct specific functioning of the exemplary electronic device 800.

The exemplary electronic device 800 may include one or more internal or connected data storage devices 830. Such data storage device(s) 830 may be used to store data or operating programs to be used by the exemplary electronic device 800, and specifically the processor(s) 820. Data storage device(s) 830 may be used to store certain operating characteristic information that may be provided to the exemplary electronic device 800 via some form of electronically writable/readable digital data storage medium, including but not limited to a SIM card. The data storage device(s) 830 may include a random access memory (RAM) or another type of dynamic storage device that is capable of storing updatable database information, and for separately storing instructions for execution of device operations by, for example, processor(s) 820. Data storage device(s) 830 may also include a read-only memory (ROM), which may include a conventional ROM device or another type of static storage device that stores static information and instructions for processor(s) 820. The data storage device(s) 830 may be integral to the exemplary electronic device 800, or may be provided external to, and in wired or wireless communication with, the exemplary electronic device 800.

The exemplary electronic device 800 may include at least one data output device 840, which may be configured as one or more conventional mechanisms that output information to a user, including a display screen or GUI of the exemplary electronic device 800.

The exemplary electronic device 800 may include, as a portion of the processors 820 and/or data storage devices 830, or as a standalone device or function a specific configuration update device 850. The configuration update device 850 may be used, for example, to receive information from electronically writable/readable digital data storage media introduced into the exemplary electronic device 800. The received information may include instructions for executing a scheme by which the exemplary electronic device 800 via the configuration update device 850 may confirm that the electronically writable/readable digital data storage media, and the information stored thereon, is compatible with, and/or authorized for use in, the exemplary electronic device 800, as verified by a manufacturer or supplier of the exemplary electronic device 800 and the electronically writable/readable digital data storage media. The configuration update device 850 may also be used to interpret the data provided by the electronically writable/readable digital data storage media in order to update one or more operating characteristics of the exemplary electronic device 800.

The exemplary electronic device 800 may include one or more separate external data interfaces, one of which may be configured as a conformal (or compatible) carrier device insertion slot 860 into which a unique carrier device, as described in detail above, to facilitate operating characteristic configuration update and identifications in the manner described. The physical configuration of the conformal carrier device insertion slot 860 may be such that physical insertion of the unique carrier device provides another level of confirmation that the electronically readable/writable digital data storage media associated with the unique carrier device, and the information stored thereon, is compatible with, and/or authorized for use in, the exemplary electronic device 800, as verified by a manufacturer or supplier of the exemplary electronic device 800.

All of the various components of the exemplary electronic device 800, as depicted in FIG. 8, may be connected by one or more data/control busses 870. These data/control busses 870 may provide wired or wireless communication between the various components of the exemplary electronic device 800, whether all of those components are housed integrally in, or are otherwise external and connected to the exemplary electronic device 800.

It should be appreciated that, although depicted in FIG. 8 as an integral unit, the various disclosed elements of the exemplary electronic device 800 may be arranged in any combination of sub-systems as individual components or combinations of components, integral to a single unit, or external to, and in wired or wireless communication with the single unit of the exemplary electronic device 800. In other words, no specific configuration as an integral unit or as a support unit is to be implied by the depiction in FIG. 8. Further, although depicted as individual units for ease of understanding of the details provided in this disclosure regarding the exemplary electronic device 800, it should be understood that the described functions of any of the individually-depicted components may be undertaken, for example, by one or more processors 820 connected to, and in communication with, one or more data storage device(s) 830 and at least one external data communication interface in the form of a conformal (or compatible) carrier device insertion slot 860 in the exemplary electronic device 800.

Figure 9:
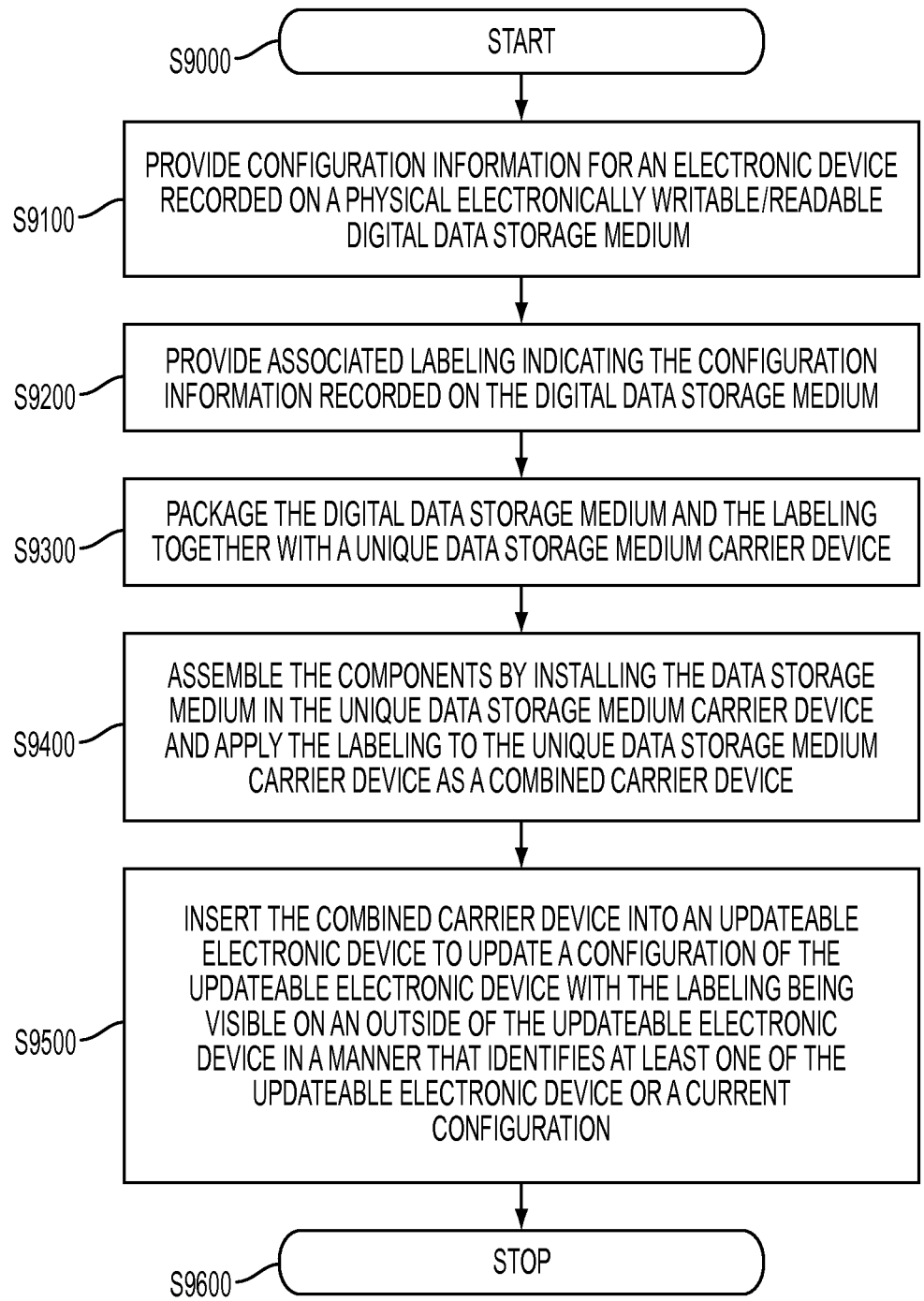
FIG. 9 illustrates a flowchart of an exemplary method for employing the exemplary combined carrier package according to this disclosure for configuration update in, and physical identification of, a particular electronic device according to this disclosure.

The disclosed embodiments may include a method for employing the exemplary combined carrier package according to this disclosure for configuration update in, and physical identification of, a particular electronic device. FIG. 9 illustrates a flowchart of an exemplary method. As shown in FIG. 9, operation of the method commences at Step S9000 and proceeds to Step S9100.

In Step S9100, configuration information regarding initial or updated operating characteristics for electronic device may be provided in a form in which the configuration information is recorded on a physical electronically writable/readable digital data storage medium. The configuration information may include some compatibility verification scheme by which a compatibility of the configuration information with a particular electronic device with which the configuration information is to be associated can be confirmed. Operation of the method proceeds to Step S9200.

In Step S9200, physical labeling associated with an indication of the configuration information recorded on the digital data storage medium may be provided. This physical labeling may be associated with a unique data storage medium carrier device into which the physical electronically writable/readable digital data storage medium may be inserted. An objective of providing the associated physical labeling is that when they unique data storage medium carrier device is inserted in the electronic device to electronically update a configuration of, for example, the operating characteristics of the electronic device, the associated physical labeling will be visually available on an outer surface of the electronic device. Operation of the method proceeds to Step S9300.

In Step S9300, the recorded digital data storage medium and the associated labeling may be packaged together, as separate components, with the unique data storage medium carrier device. The combined packaging of the recorded digital data storage medium, the associated labeling and the unique data storage medium carrier device may be bundled together with the electronic device upon delivery of the electronic device to a customer or end-user, or may be provided separately from delivery of the electronic device to the customer or end-user. Operation of the method proceeds to Step S9400.

In Step S9400, upon receipt by the customer or end-user of the package including the recorded digital data storage medium, the associated labeling and the unique data storage medium carrier device, the individual components may be assembled by installing the recorded digital data storage medium in the unique data storage medium carrier device and by affixing to an outer profile of the unique data storage medium carrier device the associated labeling. Operation of the method proceeds to Step S9500.

In Step S9500, once the component parts of the recorded digital data storage medium, the associated labeling and the unique data storage medium carrier device are assembled as a combined carrier device, the combined carrier device may be inserted into an appropriate conformal receiver slot on an outside profile of the electronic device as a single device by which to update a configuration of the operating characteristics of the electronic device and to provide physical identification of at least one of the electronic device and the configuration update provided by the recorded digital data storage medium. Operation of the method proceeds to Step S9600, where operation of the method ceases.

As indicated above, the method may positively provide a level of inventory management and configuration control to a particular class of fielded electronic devices, or at least those under the control of the specific controller or end-user.

The above-described exemplary systems and methods reference certain conventional components to provide a brief, general description of suitable operating environments and field electronic devices in which the subject matter of this disclosure may be implemented for familiarity and ease of understanding. These particular references, and brief, general description, should not be interpreted in any manner as being limiting to the disclosed subject matter.

Those skilled in the art will appreciate that other embodiments of the disclosed subject matter may be practiced in a broad spectrum of stationary and portable electronic devices, the operating characteristics of which may be updated by introducing electronically writable/readable digital data storage media in many forms including, but not limited to, SIM cards.

As indicated above, embodiments within the scope of this disclosure may specifically include computer-readable media having stored computer-executable instructions or data structures that may be particularly employed to update an operating characteristic of an electronic device when the computer-readable media are presented to the electronic device in a manner that can be accessed, read and executed by one or more processors and electronic device. Such computer-readable media can be any available media that can be accessed by a processor, general purpose or special purpose computer.

The exemplary depicted sequence of executable instructions represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 9, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A device that updates an electronic data configuration and provides physical identification information in an electronic device, comprising:

a physical data exchange storage medium;

a separate physical data exchange storage medium carrier unit into which the physical data exchange storage medium is inserted, the separate physical data exchange storage medium carrier unit being configured to be inserted into an electronic device such that the physical data exchange storage medium is inserted into the electronic device, a portion of the separate physical data storage medium carrier unit remaining physically exposed external to and on an outer surface of the electronic device; and a physical labeling configured to be visible on the exposed portion of the separate physical data exchange storage medium carrier unit external to and on the outer surface of the electronic device when the separate physical data exchange storage medium is inserted into the electronic device.

2. The device of claim 1, the physical data exchange storage medium being a Subscriber Identity Module (SIM) card.

3. The device of claim 1, an external physical profile of the physical data exchange storage medium being configured to be compatible with an internal physical profile of a slot in the separate physical data exchange storage medium carrier unit into which the physical data exchange storage medium is inserted.

4. The device of claim 3, the external physical profile of the physical data exchange storage medium being configured with at least one added protrusion or depression that corresponds to an associated at least one added protrusion or depression on the internal physical profile of the slot in the separate physical data exchange storage medium carrier unit.

5. The device of claim 1, an external physical profile of a portion of the a separate physical data exchange storage medium carrier unit being configured to be compatible with an internal physical profile of a slot in the electronic device into which the portion of the separate physical data exchange storage medium carrier unit is inserted.

6. The device of claim 5, the external physical profile of the portion of the separate physical data exchange storage medium carrier unit being configured with at least one added protrusion or depression that corresponds to an associated at least one added protrusion or depression on the internal physical profile of the slot in the electronic device.

7. The device of claim 1, the physical data exchange storage medium being programmed with electronic data that modifies an operating characteristic of the electronic device, and the physical labeling providing a corresponding indication of the modified operating characteristic.

8. The device of claim 1, the physical data exchange storage medium being further programmed with data for verifying compatibility between the operating characteristic modification and the electronic device.

9. The device of claim 1, the physical labeling being one of formed in and affixed to the physically exposed portion of the separate physical data exchange storage medium carrier unit.

10. An electronic device with an updateable electronic data configuration, comprising:

a processor that is programmed with updateable electronic data including a set of operating characteristics;

a data reader for reading and updating the set of operating instructions, an updated set of operating instructions being based on data read from a physical data exchange storage medium; and a receiver slot for receiving a separate physical data exchange storage medium carrier unit into which the physical data exchange storage medium is inserted, the separate physical data exchange storage medium carrier unit being configured to be inserted into the electronic device such that the physical data exchange storage medium is inserted into the electronic device, a portion of the separate physical data storage medium carrier unit remaining physically exposed external to and on an outer surface of the electronic device to expose a physical labeling visibly on the exposed portion of the separate physical data exchange storage medium carrier unit external to and on the outer surface of the electronic device when the separate physical data exchange storage medium is inserted into the receiver slot.

11. The electronic device of claim 10, the physical data exchange storage medium being a SIM card.

12. The electronic device of claim 10, an external physical profile of a portion of the separate physical data exchange storage medium carrier unit being configured to be compatible with an internal physical profile of the receiver slot.

13. The electronic device of claim 12, the external physical profile of the portion of the separate physical data exchange storage medium carrier unit being configured with at least one added protrusion or depression that corresponds to an associated at least one added protrusion or depression on the internal physical profile of the receiver slot.

14. The electronic device of claim 10, the physical data exchange storage medium being programmed with electronic data that modifies an operating characteristic of the electronic device, and the physical labeling providing a corresponding indication of the modified operating characteristic.

15. The electronic device of claim 14, the physical data exchange storage medium being further programmed with recorded data for verifying compatibility between the operating characteristic modification and the electronic device, and the processor being further programmed to execute a scheme for verifying the compatibility using the recorded data for verifying the compatibility.

16. A method for updating an electronic data configuration and providing physical identification information in an electronic device, comprising:

providing a physical data exchange storage medium;

providing a separate physical data exchange storage medium carrier unit;

providing a physical labeling;

inserting the physical data exchange storage medium into the separate physical data exchange storage medium carrier unit and affixing the physical labeling to an outer portion of the separate physical data exchange storage medium carrier unit that will remain physically exposed on an outer surface of an electronic device to produce a combined carrier unit; unit for insertion into the electronic device;

inserting the combined carrier unit into a slot in the electronic device, the outer portion of the combined carrier unit with the physical labeling remaining external to and physically exposed on an outer surface of the electronic device when the combined carrier unit is inserted into the electronic device to provide physical identification information on the physical outer surface of the electronic device; and updating an electronic data configuration of the electronic device by reading data from the physical data exchange storage medium, the physical labeling exposed on the outer surface of the electronic device providing a corresponding indication of the updated electronic data configuration.

17. The method of claim 16, the physical data exchange storage medium being a SIM card.

18. The method of claim 16, further comprising matching an external physical profile of the physical data exchange storage medium to a compatible internal physical profile of a slot in the separate physical data exchange storage medium carrier unit into which the physical data exchange storage medium is inserted.

19. The method of claim 18, the external physical profile of the physical data exchange storage medium being configured with at least one added protrusion or depression that corresponds to an associated at least one added protrusion or depression on the internal physical profile of the slot in the separate physical data exchange storage medium carrier unit.

20. The method of claim 16, further comprising matching an external physical profile of a portion of the separate physical data exchange storage medium carrier unit with an internal physical profile of the slot in the electronic device into which the portion of the separate physical data exchange storage medium carrier unit is inserted.

21. The method of claim 20, the external physical profile of the portion of the separate physical data exchange storage medium carrier unit being configured with at least one added protrusion or depression that corresponds to an associated at least one added protrusion or depression on the internal physical profile of the slot in the electronic device.

22. The method of claim 16, further comprising verifying compatibility between data for updating the electronic data configuration and the electronic device based on data recorded on the physical data exchange storage medium.

\* \* \* \* \*